(No Model.) 3 Sheets—Sheet 1.
R. R. TURNER.
APPARATUS FOR THE MANUFACTURE OF GAS.
No. 416,520. Patented Dec. 3, 1889.
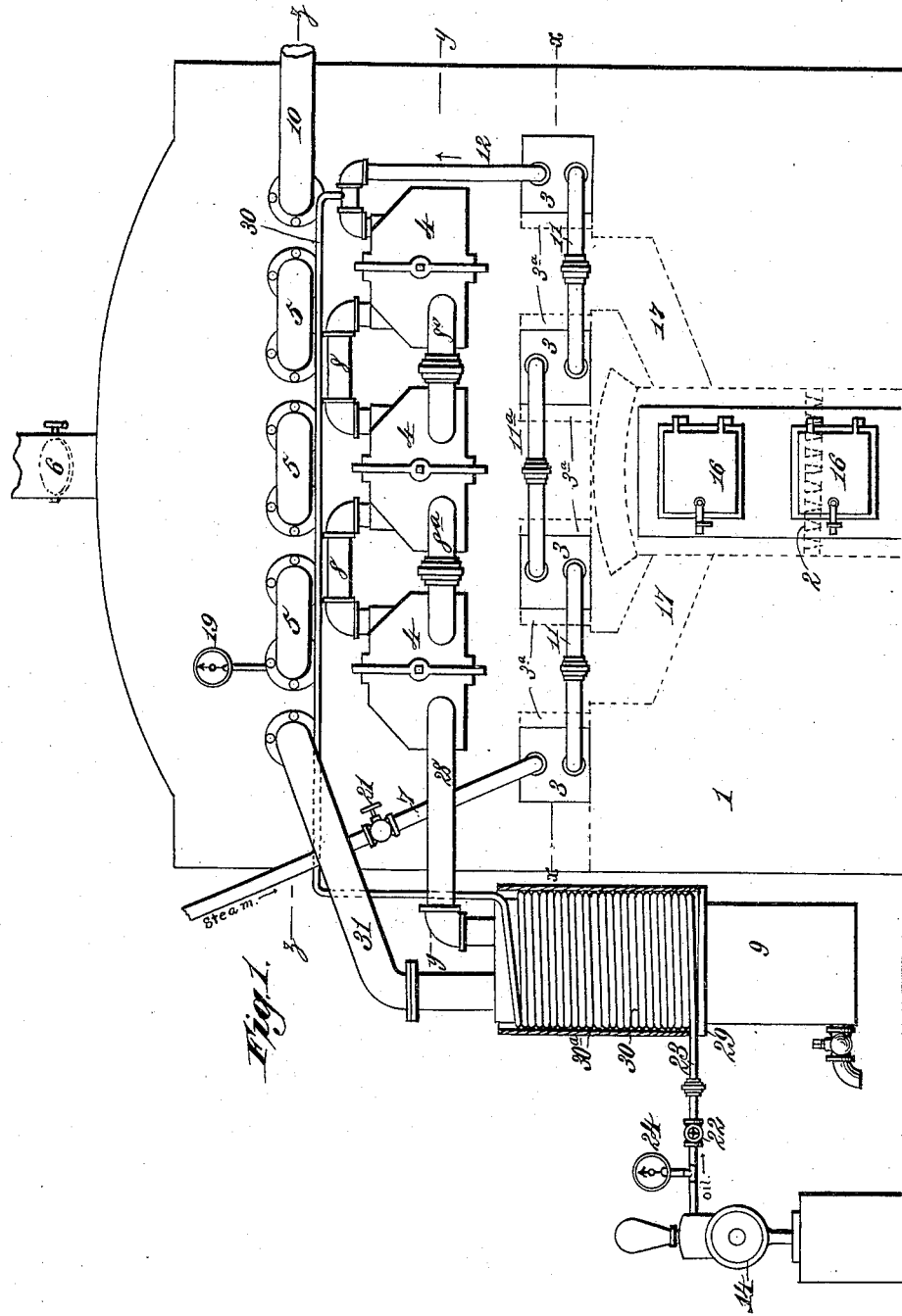
Witnesses.
Robert Everett,
Geo. H. Rea.
Inventor:
Robert R. Turner.
By James L. Norris
Atty.

(No Model.) 3 Sheets—Sheet 2.
R. R. TURNER.
APPARATUS FOR THE MANUFACTURE OF GAS.
No. 416,520. Patented Dec. 3, 1889.
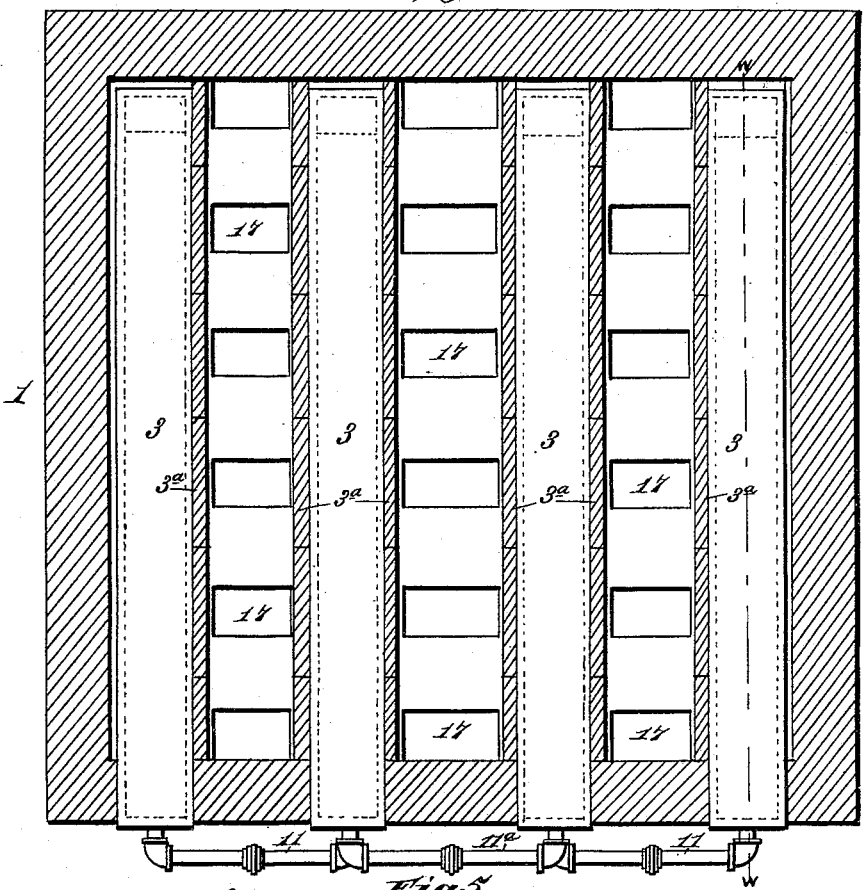
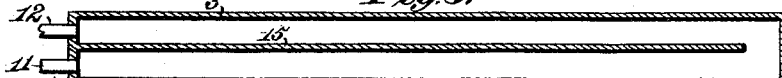
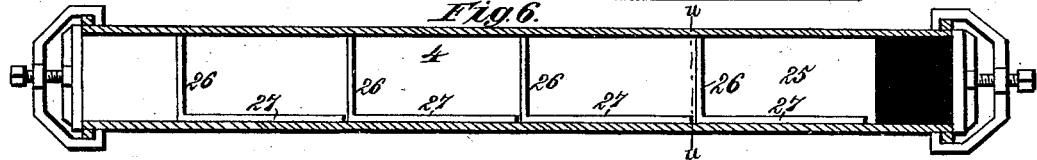
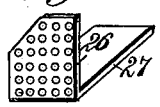
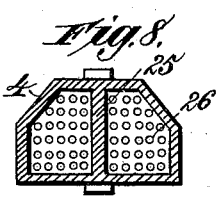
Witnesses:
Robert Garrett
Geo. H. Rea
Inventor:
Robert R. Turner,
By James L. Norris.
Atty (No Model.) 3 Sheets—Sheet 3.

R. R. TURNER.
APPARATUS FOR THE MANUFACTURE OF GAS.

No. 416,520. Patented Dec. 3, 1889.

UNITED STATES PATENT OFFICE.

ROBERT R. TURNER, OF COLUMBUS, OHIO.

APPARATUS FOR THE MANUFACTURE OF GAS.

SPECIFICATION forming part of Letters Patent No. 416,520, dated December 3, 1889.

Application filed May 27, 1889. Serial No. 312,313. (No model.)

*To all whom it may concern:*

Be it known that I, ROBERT R. TURNER, a citizen of the United States, residing at Columbus, in the county of Franklin and State of Ohio, have invented new and useful Improvements in Apparatus for the Manufacture of Gas, of which the following is a specification.

This invention has for its object to provide novel and efficient means for producing gas for illuminating and heating purposes by the decomposition of steam and vaporization of liquid hydrocarbons; to provide novel means for thoroughly decomposing the steam and vaporizing all particles of the hydrocarbon liquid and thereby avoiding the possibility of oil passing to the gas-main without being vaporized; to provide novel means for reheating and making a permanent gas of the gas produced from steam and hydrocarbon liquids by superheating the gas at a point between the gas-fixing retorts and the main; to provide novel means for collecting any tar that may be contained in the gas prior to passing the latter to the gas-superheater; to provide means for heating the hydrocarbon liquid outside the furnace structure through the medium of the hot gases from the gas-fixing retorts, whereby the oil is, by simple contrivances, placed in proper condition to combine with the steam, and to provide means whereby a tar-collector, located between the retorts and an oil-forcing pump, serves to heat the oil through the medium of the hot gases passing through such tar-collector in transit to the gas-main.

The objects of my invention I accomplish by the features of construction and combination of devices hereinafter described and claimed, reference being made to the accompanying drawings, in which—

Figure 3:
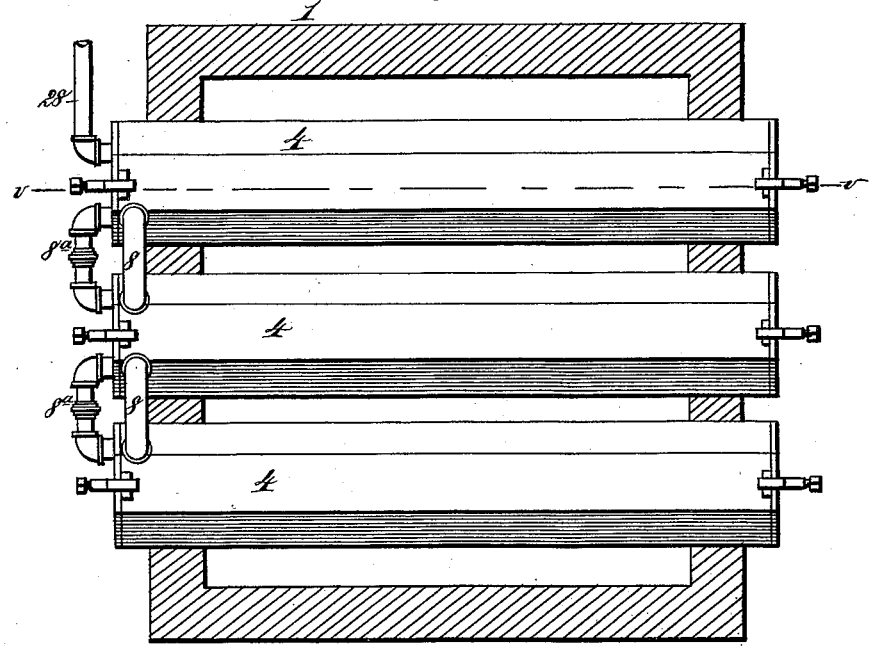
Figure 4:
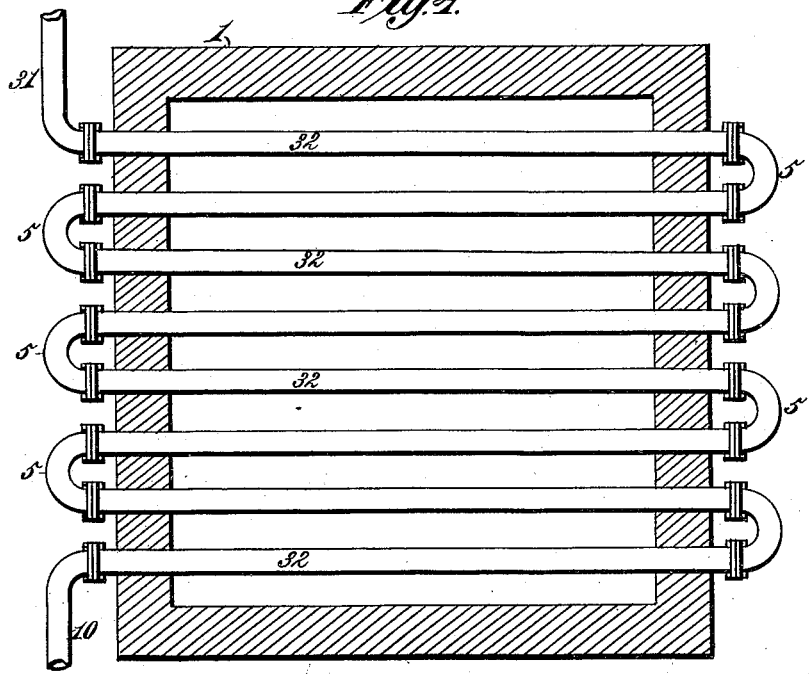

Figure 1 is a front elevation of the improved apparatus for manufacturing illuminating and heating gas. Fig. 2 is a detail horizontal sectional view taken on the line $x\ x$, Fig. 1, showing the flues for conducting the products of combustion from the fire-chamber, the steam-superheating boxes being in plan, with the internal partition indicated by dotted lines. Fig. 3 is a similar view taken on the line $y\ y$, Fig. 1. Fig. 4 is a similar view taken on the line $z\ z$, Fig. 1. Fig. 5 is a longitudinal sectional view through the initial steam-superheating box, taken on the line $w\ w$, Fig. 2. Fig. 6 is a longitudinal sectional view through one of the gas-fixing retorts, taken on the line $v\ v$, Fig. 3. Fig. 7 is a detail end view of one of the perforated plates in the initial one of the series of gas-fixing retorts for mixing the steam and oil. Fig. 8 is a transverse sectional view on the line $u\ u$, Fig. 6.

In order to enable those skilled in the art to make and use my invention, I will now describe the same in detail, referring to the drawings, where—

The numeral 1 indicates a furnace structure suitably constructed of brick-work or otherwise, and having the fire-grate 2, fire and ash-pit doors 16, and opposite laterally and vertically extending flues 17, for conducting the products of combustion upward toward a chimney rising from the top of the furnace and provided with a damper 6 to regulate the draft.

The numerals 3 indicate a series of steam-superheating metallic boxes arranged in a horizontal plane side by side, extending from front to rear of the furnace structure and projecting through the front wall thereof, such boxes being separated by intervening flue-spaces and protected at their sides from the direct action of the fire by fire-brick or other refractory material $3^a$, as represented by dotted lines, Fig. 1, and full lines, Fig. 2. The boxes each contain a horizontal partition 15, which extends from its front end to a point near its rear end, thereby dividing the box into a lower and an upper compartment that communicate through the opening or passage-way at the rear end of the partition. The lower compartment of one box is placed in communication with the corresponding compartment of the adjacent box through the medium of an external tube-connection 11 at the front end; and the upper compartments of the two intermediate boxes are similarly placed in communication by a tube-connection $11^a$. The upper compartment of the initial or first box of the series is connected with a steam-supply pipe 7, having a cock or valve 21; and the upper compartment of the final or last of the series of boxes is connected by a discharge-pipe 12 with the initial or first one of a series of gas-fixing retorts 4, arranged in a horizontal plane side by side above the steam-superheating boxes. The gas-fixing retorts are each divided into two longitudinal side chambers by a vertical partition 25, extending from the front end to a point near the rear end, having at the latter point an opening or passage-way for the communication of the two side chambers.

In both the chambers of the initial or first retort 4 of the series, which is the one connected to the pipe 12, are arranged a series of removable and replaceable perforated metal plates 26, having flanges or feet 27, resting on the bottom walls of the chambers to support such plates in vertical position. The perforations in the plates are preferably about three-sixteenths of an inch in diameter and are for the passage and admixture of the gases in the initial retort.

The front ends of the adjacent chambers of the respective retorts are placed in communication at the top by tube-connections 8, and at or near the bottoms by similar tube-connections $8^a$, said connections 8 conducting the main portion of the vaporized oil and decomposed steam from one retort to the other. The duplex tube-connection of each pair of retorts also serve to more thoroughly mix the gases.

The pipe 12 connects the outer chamber of the initial or first retort 4 with the upper compartment of the final or last box 3, and the outer chamber of the final or last retort 4 is connected by a pipe 28 with the top portion of a tar-collecting vessel 9. This is located outside the furnace structure, and is provided at or near the middle of its length with a shoulder or flange 29, that supports a coil of oil-heating piping 30, encircling the tar-collecting vessel and having its upper end carried above the gas-fixing retorts 4 and connected with the pipe 12, while the lower end of the coiled piping connects by a pipe 23, having a valve 22, with an oil-forcing steam-pump or other pumping mechanism 14 of any appropriate construction. A jacket $30^a$, of iron or steel, surrounds the coil of pipe 30, to retain the heat therein, and this jacket is made in sections, or of any suitable construction whereby it may be removed when necessary.

The tar-collecting vessel is furnished at its bottom with a suitable tar-discharge cock or outlet, and from the top of said vessel extends a pipe 31, that connects with the initial or first one of a series of gas superheating and drying pipes 32, alternately connected at their extremities by return-bends 5. The final or last one of these pipes communicates with a delivery-pipe 10, for conveying the superheated and dried gas to the main or other place desired.

The superheating-boxes, gas-fixing retorts, and gas-superheating pipes are heated to a red heat by the products of combustion from the fire-chamber of the furnace-structure, and then the steam-supply is opened and the oil-pump started, so that the steam enters the upper compartment of the initial or first superheating-box, passes along to the rear thereof and around the partition into the lower compartment and to the front of the box. Thence the steam passes by the tube-connection 11 to the lower compartment of the second box, around its partition into the upper compartment; thence by tube-connection $11^a$ to the upper compartment of the third box, around its partition into the lower compartment thereof, and thence to the lower compartment of the final or last box into its upper compartment and by the pipe-connection to the outer chamber of the initial or first gas-fixing retort. During its passage through the superheating-boxes the steam is decomposed, and as it passes through the upper limb of the pipe 12 it meets the oil entering by way of the pipe 30. As the steam and oil come in contact the carbon of the oil seizes upon the oxygen of the steam and at the same time liberates the hydrogen, and the steam and vaporized oil are mixed and converted in their passage through the retort into a rich hydrocarbon gas. The gas passes rearward through the perforated plates in the outer chamber of the initial retort; thence around the partition and through the perforated plates in the other chamber to the front end. The perforated plates are to more thoroughly mix the steam and oil and aid in their conversion into a fixed gas, which passes through the second retort rearward and forward, and thence rearward and forward through the final or last retort. By the repeated passage of the gas through the several retorts every particle of oil is gasified and there is no probability of any oil passing through and not being converted. The hot gas from the final retort enters the tar-collecting vessel, where any existing tar is deposited, the hot gases at the same time heating the vessel and through the latter heating the coiled piping, whereby the oil in or passing through the latter is heated and placed in the proper condition to pass into the initial gas-fixing retort. The heating of the oil prior to its meeting the steam avoids lowering the temperature of the latter at the time it enters the retort, which is very desirable. From the tar-collecting vessel the gas passes to the gas-superheaters, where it is reheated and made a permanent gas, and is thence conveyed to the main or other point desired.

In the manufacture of illuminating-gas the gas usually passes from the retorts to the main or similar place ready for consumption; but in contradistinction thereto the fixed gas in my apparatus passes to and back and forth through the superheating-pipes above the gas-fixing retorts, whereby the gas is highly reheated and made into a permanent gas. This is very desirable and an important feature of the invention.

A gage 19 is preferably placed on one of the gas-superheating pipes to indicate the gas-pressure, and a similar gage 24 is placed on the oil-supply pipe near the steam-pump to indicate the oil-pressure.

I do not confine myself to any specific number of boxes in the series of steam-superheaters, nor to any specific number of retorts in the series of gas-fixing retorts, and the same remark applies to the series of gas-superheaters. The gas-superheating pipes extend through the front and rear of the furnace structure, and the return-bends are removable and replaceable for facility of cleaning the pipes. The gas-fixing retorts are furnished with removable and replaceable lids at each end for facility of cleaning the retorts; and by providing the perforated plates with flanges or feet to support them, they can be loosely set in the initial retort and be removed and replaced at will, or adjusted relatively to each other along the retort. The superheating-boxes extend the full length of the furnace structure, so that the steam, passing back and forth through each box, is thoroughly decomposed.

Heretofore in the manufacture of gas from steam and oil heated oil has been delivered into steam and thence conducted to a hot retort; but I am not aware that oil has prior to my invention been heated by the hot gases from the gas-fixing retorts before the oil enters the steam-supply. A gas-fixing retort has also been provided with perforated brick tiles and pieces of iron between the latter; but I am not aware that perforated plates have been so constructed with horizontal supporting base-flanges or feet that they could be loosely set in the retort and be removed and replaced at will.

By virtue of the pump which forces the oil I avoid the use of steam and oil injectors at the retorts, and, besides, by the pressure I am enabled to force the gases through the retorts, tar-collector, and gas-superheating pipes.

Having thus described my invention, what I claim is—

1. In an apparatus for the manufacture of gas, the combination of a furnace structure, a series of connected steam-superheating boxes, a steam-supply pipe in communication with the boxes, a series of gas-fixing retorts, a connection between one of the boxes and one of the retorts, a tar-collector connected with one of the gas-fixing retorts, an oil-supply pipe communicating with the connection between the said box and retort, a gas-reheater for reheating and making permanent the steam and hydrocarbon gas, and a connection between the tar-collector and the reheater, substantially as described.

2. In an apparatus for the manufacture of gas, the combination of a furnace structure, a series of alternately-connected steam-superheating boxes, a steam-supply pipe entering one of the boxes, a series of alternately-connected gas-fixing retorts arranged above said boxes, a connection between one of the boxes and one of the retorts, an oil-supply pipe communicating with said connection, a series of alternately-connected gas-reheating pipes arranged in the furnace structure above the gas-fixing retorts, a tar-collector in juxtaposition to the furnace structure, a pipe-connection extending from one gas-fixing retort into the tar-collector, and a pipe-connection between the tar-collector and one of the reheating-pipes, substantially as described.

3. In an apparatus for the manufacture of gas, the combination of the furnace structure, the steam-superheaters, the steam-pipe communicating with the latter, the gas-fixing retorts having a pipe-connection with the superheaters, a tar-collector in juxtaposition to the furnace structure, a pipe-connection between the tar-collector and the retorts, an oil-supply pipe coiled around the tar-collector and communicating at one end with the pipe-connection between the retorts and superheaters, and an oil-pump connected with the other end of the oil-pipe, substantially as described.

4. In an apparatus for the manufacture of gas, the combination of the furnace structure, the connected steam-superheaters, the connected gas-fixing retorts having a pipe-connection with the superheaters, a steam-pipe communicating with the superheaters, a tar-collector having an external shoulder and in communication with the gas-fixing retorts, an oil-pipe coiled around the tar-collector, resting on the shoulder thereof and in communication with the pipe-connection between the retorts and superheaters, and a jacket surrounding the coiled part of the oil-pipe on the tar-collector, substantially as described.

5. In an apparatus for the manufacture of gas, the combination of a furnace structure, a series of superheating-boxes, each having a horizontal partition with its rear end in proximity to the rear wall of the box and dividing the latter into upper and lower chambers, tubes alternately connecting the lower and upper chambers of the boxes, a steam-pipe entering one box, a series of gas-fixing retorts located above the boxes and each containing a vertical partition with its rear end in proximity to the rear wall of the retort and dividing the latter into two side chambers, a lower series of tubes alternately connecting the lower portions of the side chambers in the retorts, an upper series of tubes alternately connecting the upper portions of said side chambers, a pipe-connection between the side chamber of one retort and the upper chamber of a superheating-box, and an oil-supply pipe in communication with the said pipe-connection, substantially as described.

6. The combination, with a steam-superheater having a steam-supply pipe, a gas-fixing retort having a pipe-connection with the superheater and containing a vertical partition dividing it into two side chambers, and an oil-supply pipe in communication with said pipe-connection, a series of vertical, removable, and replaceable partitions arranged in the said chambers and each having numerous perforations for subdividing the vapors, substantially as described.

7. The combination, with a steam-superheater having a steam-supply pipe, and a gas-fixing retort having a pipe-connection with the superheater and containing a vertical partition dividing it into two side chambers, of a series of vertical plates arranged in the said side chambers and each formed with a horizontal base-flange and numerous perforations which subdivide the vapors, substantially as described.

In testimony whereof I have affixed my signature in presence of two witnesses.

ROBERT R. TURNER.

Witnesses:
 J. A. KEGHT,
 ESTHER STEINFELD.